United States Patent [19]
Griffin
[11] 3,940,228
[45] Feb. 24, 1976

[54] TELEPHONE CORD MANDREL END RETAINER

[75] Inventor: Richard H. Griffin, Riverside, R.I.

[73] Assignee: International Telephone and Telegraph Corporation, Nutley, N.J.

[22] Filed: Aug. 8, 1974

[21] Appl. No.: 495,614

[52] U.S. Cl. .................. 425/403; 425/445; 269/47; 140/89; 140/92.1

[51] Int. Cl.$^{2}$ .......................................... B29C 17/02

[58] Field of Search ..... 425/403, 445; 140/89, 92.1, 140/29, 93; 269/47, 52

[56] References Cited

UNITED STATES PATENTS

| | | | |
|---|---|---|---|
| 1,334,704 | 3/1920 | Kubasta | 140/92.1 |
| 1,665,877 | 4/1928 | Fernald | 269/47 |
| 2,061,516 | 11/1936 | Frese | 140/89 UX |
| 2,920,422 | 1/1960 | Freiberg | 269/47 X |
| 3,545,069 | 12/1970 | Krieger | 269/47 X |

*Primary Examiner*—Robert L. Spicer, Jr.
*Attorney, Agent, or Firm*—John T. O'Halloran; Menotti J. Lombardi, Jr.

[57] ABSTRACT

A molded plastic fixture holds an end of a telephone wire cord wound on a mandrel to retain the cord in position during subsequent heat processing. The mandrel fits into a bore in the fixture and an angled arm extending from one side holds a band spacer and strain relief member at the end of the cord. An opposite side of the fixture includes a channel to receive cords with no strain relief member. A manually adjustable screw clamps the end of the mandrel within the bore of the fixture.

11 Claims, 3 Drawing Figures

TELEPHONE CORD MANDREL END RETAINER

BACKGROUND OF THE INVENTION

1. Field of the Invention

The present invention is directed to a novel fixture for holding a wire cord wound on a mandrel and particularly to a plastic retainer which can be used with telephone cords of different types and does not contaminate the wire cord.

2. Description of the Prior Art

Telephone wire cords which connect the hand held earpiece to the base of the telephone receiver are usually coiled and heat treated to maintain the set of the coils. The cord is wound on a mandrel and held between a fixed retainer at one end and a removable retainer at the other end. The assembly is then placed in a oven to heat the wire cord. Previous retainers or dogs were made of aluminum which flaked off in the form of aluminum oxide dust during the heat treatment and later removal from the mandrel. This caused undesirable contamination of the wire cord and equipment. In addition, it was necessary to use different retainers for some cords having strain relief members at the end and others which did not.

SUMMARY OF THE INVENTION

It is therefore the primary object of the present invention to provide a novel telephone cord mandrel end retainer which is of a material that does not contaminate the cord as a result of heat treatment and is useable with different types of cords.

This is accomplished by use of an end retainer made of a moldable plastic material of a particular configuration which can hold the ends of both cord types having strain relief members as well as those which do not. The retainer includes a bore to accommodate the mandrel, an arm with bifurcated fingers extending from one side to hold a band spacer and strain relief member at the end of the wire cord and a channel on the opposite side for cords without a strain relief member. A manually adjustable screw also clamps the end of the mandrel within the bore. The details of the invention and other objects and advantages will become apparent from the following description in conjunction with the accompanying drawings.

DESCRIPTION OF THE PREFERRED EMBODIMENT

Figure 1:
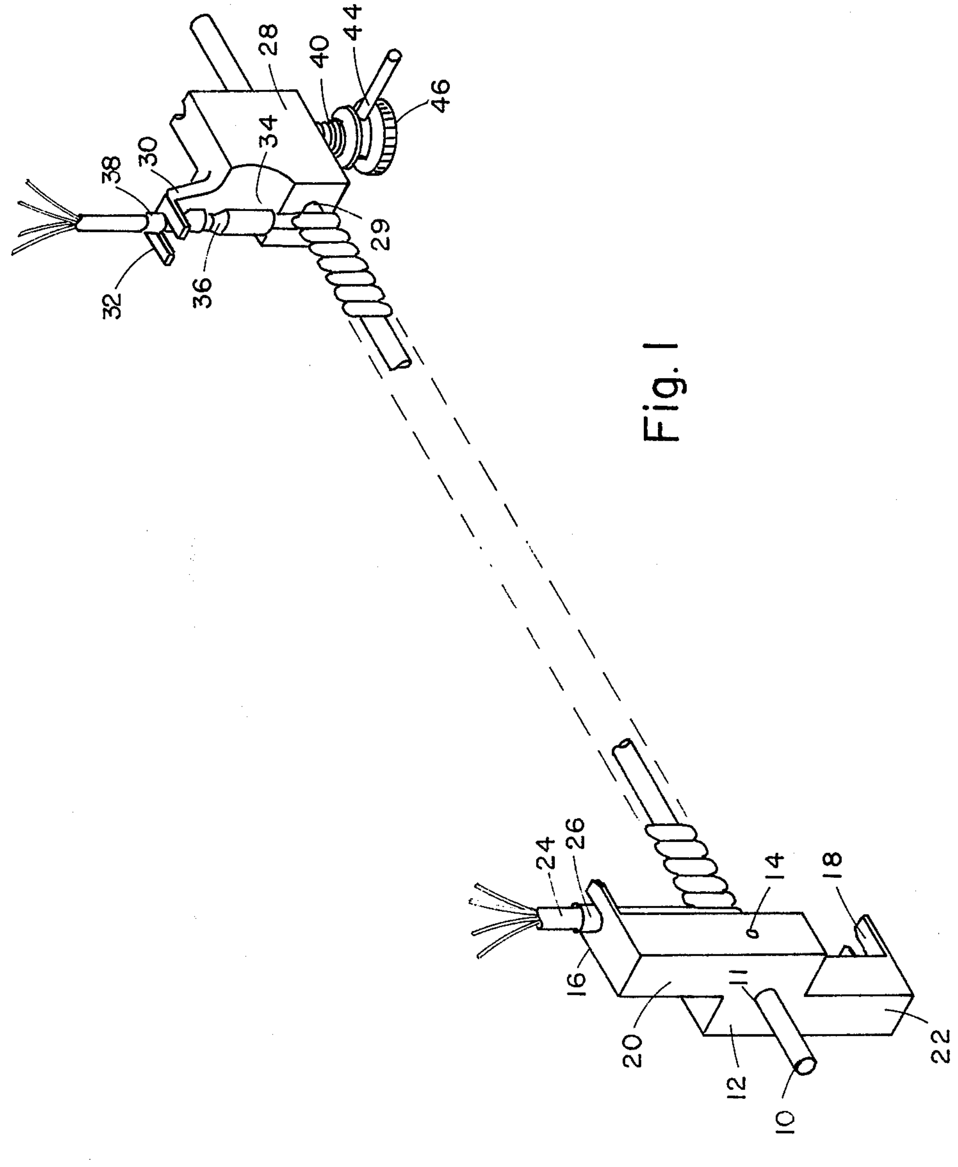
FIG. 1 is an isometric view showing the assembly of the cord mandrel end retainer and associated elements.

As shown in FIG. 1, a stainless steel mandrel or rod 10 is secured within a bore 11 of a first molded plastic dog or retainer 12 at one end. Retainer 12 is preferably of nylon and is secured to the mandrel by a pin 14. Two sets of bifurcated fingers 16, 18 extend horizontally from the opposite ends on the inner side of like upper and lower portions 20, 22. The upper and lower portions have the same configuration but extend in opposite directions with respect to the central bore so that either portion may be used to hold one end of a wire cord 24. The fingers of each pair are spaced apart sufficiently to receive the wire cord therebetween, while a metal band spacer 26 of larger diameter is held on the top surface of the fingers. This end of the cord is generally the end that connects to the base of a telephone set.

In order to prepare for the heat treatment process, one end of the telephone cord is secured within the fingers of retainer 12 which is fixed to one end of the mandrel. That end of the mandrel is placed in a cord winding machine, a few turns are manually wound adjacent the retainer and the wire is then fed by hand as the machine turns to wind the desired cord length onto the mandrel. Cords of from 8 to 25 feet in length are wound on mandrels into coiled sections of from 1½ to 5 feet.

Figure 2B:
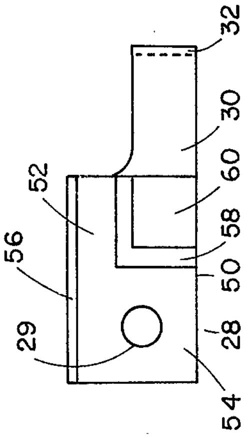
FIGS. 2*a* and 2*b* show side and end views of the novel retainer.
Figure 2A:
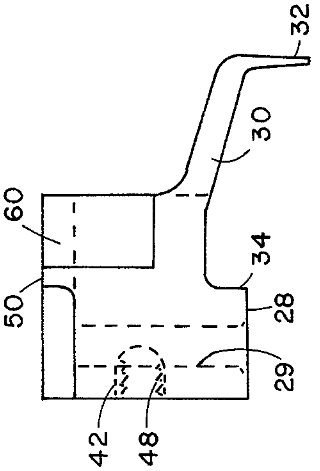

The second retainer 28, preferably of molded plastic such as nylon, is then slipped onto the opposite end of mandrel 10 which fits into bore 29. One side of retainer 28, as shown more clearly in FIG. 2*a*, includes an upwardly extending angled arm 30 having a set of bifurcated fingers 32 which project horizontally over the wound cord. The angled arm provides a strong support and the space between the fingers 32, a lower ledge 34 and arm 30 is designed to provide clearance for and receive a strain relief member 36 at the loose end of the cord 24. This end, which includes another band 38, is the one which normally connects to the hand held earpiece of the telephone set. The fingers 32 are spaced apart to receive the cord diameter between the upper end of strain relief member 36 and band 38. After the cord end is mounted on retainer 28, a manually adjustable plastic screw 40 at the bottom of the retainer, is tightened against the mandrel to hold the cord in a fixed position for the following heat treatment. The screw is threaded into hole 42 which is aligned with bore 29 within the retainer. Screw 40 is preferably of the same molded nylon as the two end retainers and includes a lateral hole for a stainless steel roll pin 44 and a knurled knob 46 to facilitate manual adjustment. In addition, a threaded steel insert 48 in the bottom hole 42 of retainer 28 provides a more secure fastening and avoids stripping of threads.

The same retainer 28 is also used for securing cord ends which do not have strain relief members. This is done by merely reversing the retainer and sliding the opposite side 50 onto the mandrel facing the cord. In this case a vertical channel 52 accommodates the vertical end of the cord and flat area 54 bounded by walls 56, 58 receives the coiled wire portion around the mandrel. The band at the cord end fits over the top of the vertical channel. A cut-out portion 60 merely reduces the quantity of plastic material required for molding the retainer.

The present invention thus provides an improved end retainer for telephone cords wound on mandrels which avoids contamination of the cord and can be used with cords having different end terminations. While only a single embodiment has been illustrated and described, it is apparent that other variations may be made in the particular design and configuration without departing from the scope of the invention as set forth in the appended claims.

What is claimed is:

1. A fixture for holding a wound wire cord comprising:

a mandrel, a wire cord wound around said mandrel, a first wire cord end retainer secured at one end of said mandrel for holding one end of said wound cord, a second wire cord end retainer slidably secured at the other end of said mandrel for holding the other end of said wound cord, the body of said second retainer including a bore accommodating said mandrel and an arm extending upwardly at an angle from one side of said retainer, said arm including bifurcated fingers extending from said arm and adapted to receive the other end of said wire cord, said one side including a ledge spaced from said fingers, the space between said ledge and fingers being adapted to receive a strain relief member at said other end of said wire cord, and means for detachably securing said second retainer at said other end of said mandrel.

2. The device of claim 1 wherein said second retainer is of a moldable plastic material.

3. The device of claim 2 wherein said fingers extend from said arm at another angle, said fingers and ledge being substantially parallel.

4. The device of claim 2 wherein said second retainer is reversible to slidably engage said mandrel from the opposite side and includes a channel in said opposite side adapted to receive said other end of said cord without a strain relief member.

5. The device of claim 4 wherein said moldable plastic material is nylon.

6. The device of claim 4 wherein said detachable securing means is a manually adjustable screw threadably engaging said second retainer and aligned with said bore.

7. A retainer for holding an end of a wire cord wound on a mandrel comprising:

a body portion having a bore therein adapted to slidably engage a mandrel, an arm extending upwardly at an angle from one side of said retainer, said arm including bifurcated fingers extending from said arm and adapted to receive an end of said wire cord, said one side including a ledge spaced from said fingers, the space between said ledge and fingers being adapted to receive a strain relief member at said end of said wire cord, and means for detachably securing said retainer to said mandrel.

8. The device of claim 7 wherein said retainer is of a moldable plastic material.

9. The device of claim 8 wherein said fingers extend from said arm at another angle, said fingers and ledge being substantially parallel.

10. The device of claim 8 wherein the opposite side of said retainer includes a channel adapted to receive an end of said wire cord without a strain relief member.

11. The device of claim 10 wherein said detachable securing means is a manually adjustable screw threadably engaging said retainer and aligned with said bore.

* * * * *